(No Model.)
R. P. JOHNSON.
REGULATING DEVICE FOR SUGAR WASHERS.
No. 511,204. Patented Dec. 19, 1893.
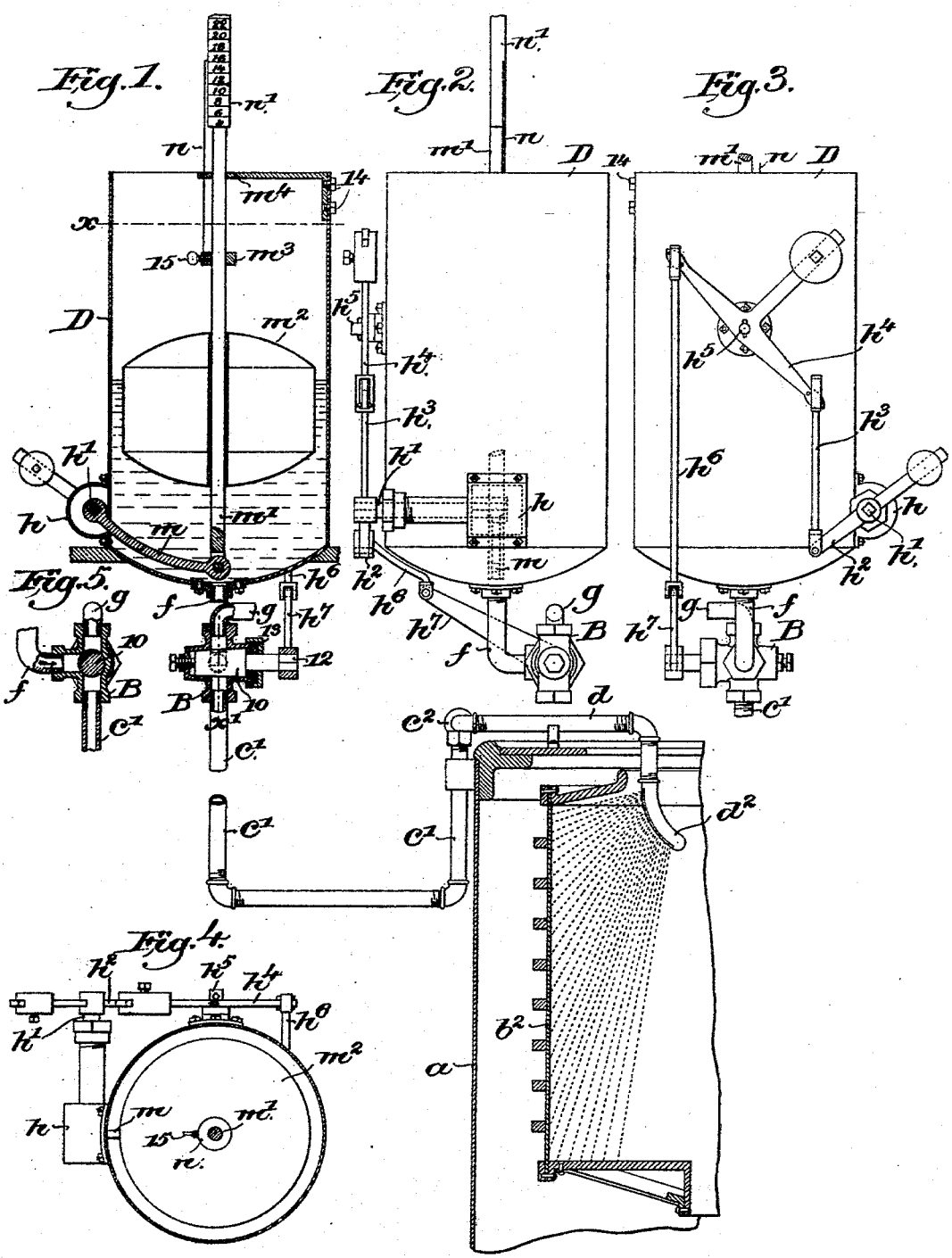
Witnesses.
Edward F. Allen
Louis N. Gowell
Inventor:
Richard P. Johnson,
by Crosby & Gregory attys.

UNITED STATES PATENT OFFICE.

RICHARD P. JOHNSON, OF BOSTON, MASSACHUSETTS.

REGULATING DEVICE FOR SUGAR-WASHERS.

SPECIFICATION forming part of Letters Patent No. 511,204, dated December 19, 1893.

Application filed March 20, 1893. Serial No. 466,840. (No model.)

*To all whom it may concern:*

Be it known that I, RICHARD P. JOHNSON, of Boston, county of Suffolk, State of Massachusetts, have invented an Improvement in Apparatus for Washing Sugar, of which the following description, in connection with the accompanying drawings, is a specification, like letters and figures on the drawings representing like parts.
This invention is intended as an improvement upon that described in United States Patent No. 482,179, granted to me September 6, 1892, and has for its object the production of an apparatus whereby the quantity of water employed in washing the sugar-wall shown in the patent referred to may be absolutely determined, thus avoiding the use of too much or too little water. I have herein shown the regulating apparatus in connection with the centrifugal machine of the said patent.

In accordance with my invention I have combined with the pipe leading the water to the desired object, a tank and float, the float operating a suitable valve to permit the discharge of water from the tank into the delivery pipe the float then descending; the float as it reaches or comes into its lowest position acting to cut off the flow of water from the tank to the delivery pipe and opening the cock to let water flow from the main or supply or other suitable head or reservoir of water to thus effect the raising of the float into the tank, the tank when properly filled having the water automatically cut off from it by or through the movement of said float.

Figure 1 in vertical section shows a sufficient portion of a centrifugal machine with my improved washing apparatus and tank connected therewith, the pipe leading from the tank to the perforated shoe being in elevation and being partially broken out to save space upon the drawing. Fig. 2 is an elevation of the tank and the parts attached to it down to the three-way cock. Fig. 3 is an elevation of the parts shown in Fig. 2 looking from the left. Fig. 4 is a section below the line $x$ Fig. 1, showing the tank and float therein; and Fig. 5 is a detail in the section-line $x'$ Fig. 1 through the three-way cock.
Referring to the drawings, the curb $a$, the centrifugal basket $b^2$ therein; the perforated shoe $d^2$, the pipe $d$ connected thereto; the valve $c^2$ intermediate said pipe $d$ and the pipe $c'$, are and may be all substantially as shown in said patent, but herein the pipe $c'$ is continued to the shell of the three-way cock B, said cock receiving a suitable plug, as 10, so constructed as to open communication between the pipe $f$ leading from tank D into the valve casing and the pipe $c'$ or to open communication between said pipe $f$ and the supply pipe $g$ leading to a suitable head or reservoir of water.

The tank D has at one side of it a suitable stuffing box $h$, in which is mounted a shaft $h'$, having an arm $h^2$, at its outer end, said arm being jointed by link $h^3$ with, as herein shown, a balanced-three-armed lever $h^4$, pivotally mounted at $h^5$ outside the tank, said lever having attached to it a second link $h^6$ which is jointed to an arm $h^7$ applied to the outer end 12 of the valve 10, where the same is extended through the stuffing-box 13 of the casing B.

The shaft $h'$, at its inner end, has attached to it an arm $m$, shown by full lines in Fig. 1 and by dotted lines in Fig. 2, said arm being jointed to the float guide-rod $m'$, having mounted upon it a suitable float $m^2$, said rod above said float having adjustably mounted upon it a collar $m^3$ to be struck, sooner or later, by the float as it rises, the float acting on the collar and lifting the rod to turn the three-way cock and shut off the water entering the tank from the reservoir, the amount of water to be admitted into the tank being controlled by the position of the collar $m^3$ on the said rod.

$m^4$ represents a guide for rod $m'$, the guide being attached to the tank by screws 14.

The collar $m^3$ in practice has secured to it, by a suitable screw 15, a pointer $n$, shown as a spring, one end of which co-operates with a suitable gage or index $n'$ attached to rod $m'$, said finger serving to indicate the quantity of water in the tank.

The drawings show the float as descending, the perforated shoe being turned into the basket, the three-way cock at such time opening communication between the tank-pipe $f$ and the pipe $c'$.

In operation let it be supposed that the normal condition of the parts is with the tank filled with the quantity of water desired and with the float against the collar $m^3$, the float in such position having turned the three-way cock to cut off the inflow of water into the tank through pipes $g$ and $f$, and opened the three-way cock to connect the tank with the pipe $c'$, and that the perforated shoe is in its normal position out of the basket, the water being also cut-off at $c^2$ by the valve at that point. The operator being desirous of washing the sugar-wall turns the perforated shoe into the basket, as represented by full lines, which done, the valve $c^2$ is opened, and the water contained in the tank D immediately commences to flow through the pipes $f$, $c'$, into the perforated shoe, and at the same time the descent of the water in the tank permits the float to descend, and the latter, substantially as it reaches its lowest position, operates the plug 10 of the three-way cock, so that the flow of water through the pipe $f$ into pipe $c'$ is cut off, such movement of the plug 10 also putting into communication the pipes $f$ and $g$, so that the water immediately enters the valve shell from the pipe $g$, runs into the pipe $f$ and thence into the tank again raising the float, the operation of raising the float going on until the float by acting against the collar $m^3$ again turns the three-way cock to cut off the inflow of water. The quantity of water having been admitted to the centrifugal basket from the tank, such admission being apparent to the operator by the cessation of the water at the perforated shoe, the operator turns the shoe up out of the centrifugal basket, and he does this while the float is rising and before it reaches the upper limit of its travel, so that as the float arrives at the upper end of its travel it turns the valve plug 10 and puts the pipes $f$ and $c'$ again in communication, so that when the perforated shoe is again turned down into the centrifugal basket and the valve $c^2$ is opened again the water in the tank will flow through the pipes $f$ and $c'$ and the valve $c^2$ to the shoe.

This invention is not limited to the exact shape shown for the three-way cock, as instead I may use any other usual or suitably shaped valve having three ways, and so also the particular mechanism between the float and the three-way valve may be changed without departing materially from my invention.

By my invention I am enabled to greatly reduce the quantity of water used in washing the sugar-wall and attain better results.

Having described my invention, what I claim as new, and desire to secure by Letters Patent, is—

In an apparatus for automatically supplying a definite quantity of water, a pipe as $c'$ through which the water is delivered to the desired object; a cock or valve therein; a tank to contain a measured quantity of water; a feed-pipe to supply the tank with water; a three-way valve located at the junction of the pipe $c'$ with the feed-pipe and with the pipe leading to the said tank, combined with a float in said tank, and devices intermediate to it and the said three-way valve to operate the latter, substantially as described.

In testimony whereof I have signed my name to this specification in the presence of two subscribing witnesses.

RICHARD P. JOHNSON.

Witnesses:
GEO. W. GREGORY,
LAURA MANIX.